(12) United States Patent
Dottling et al.

(10) Patent No.: US 7,260,761 B2
(45) Date of Patent: Aug. 21, 2007

(54) METHOD AND DEVICE FOR TRANSFERRING DATA WHEREIN A BIT RATE ADAPTATION MODEL IS SIGNALED BETWEEN THE TRANSMITTER AND THE RECEIVER

(75) Inventors: Martin Dottling, Neubiberg (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 336 days.

(21) Appl. No.: 10/500,877

(22) PCT Filed: Dec. 27, 2002

(86) PCT No.: PCT/DE02/04745

§ 371 (c)(1),
(2), (4) Date: Jul. 7, 2004

(87) PCT Pub. No.: WO03/058870

PCT Pub. Date: Jul. 17, 2003

(65) Prior Publication Data

US 2005/0076284 A1    Apr. 7, 2005

(30) Foreign Application Priority Data

Jan. 7, 2002  (DE)  ............... 102 00 296
Jan. 15, 2002  (DE)  ............... 102 01 330

(51) Int. Cl.
*H04L 1/18*    (2006.01)

(52) U.S. Cl. ............... 714/751; 714/748; 714/776

(58) Field of Classification Search ............... 714/751, 714/776; *H04L 1/18*
See application file for complete search history.

(56) References Cited

U.S. PATENT DOCUMENTS

| 4,908,827 | A  | * | 3/1990 | Gates ....................... 714/790 |
| 6,247,150 | B1 |   | 6/2001 | Niemela |
| 2003/0120990 | A1 | * | 6/2003 | Elbwart et al. ............. 714/748 |
| 2003/0126536 | A1 | * | 7/2003 | Gollamudi et al. ......... 714/748 |
| 2003/0131303 | A1 | * | 7/2003 | Kim et al. .................. 714/755 |
| 2004/0049725 | A1 | * | 3/2004 | Golitschek et al. ......... 714/776 |
| 2004/0181618 | A1 | * | 9/2004 | Dottling et al. ............. 710/33 |
| 2005/0193307 | A1 | * | 9/2005 | Wengerter et al. ......... 714/749 |

FOREIGN PATENT DOCUMENTS

| DE | 19959179 | | 6/2001 |
| JP | 2002051030 A | * | 2/2002 |
| WO | 01/47124 | | 6/2001 |

OTHER PUBLICATIONS

M. L. B. Riediger et al.; Application of Reed-Solomon Codes with Erasure Decoding to Type-II Hybrid ARQ Transmission; Global Telecommunications Conference 2003. GLOBECOM'03. IEEE; Dec. 1-5, 2003; pp. 55-59, vol. 1.*
Dammer et al.; A data puncturing IR-scheme for type-II hybrid ARQ protocols using LDPC codes; Global Telecommunications Conference, 2004. GLOBECOM '04, IEEE; Nov. 29-Dec. 3, 2004; pp. 3012-3016, vol. 5.*

* cited by examiner

*Primary Examiner*—R. Stephen Dildine
(74) *Attorney, Agent, or Firm*—Bell, Boyd & Lloyd LLP

(57) ABSTRACT

The invention relates to a method for enabling most reliable packet orientated data transfer to take place by using an ARQ-method, especially a hybrid-ARQ-method, preferably for use in a mobile radio system. The invention also relates to a bit rate adaptation model which is used for signaling between the transmitter and the receiver.

39 Claims, 3 Drawing Sheets

$e = e_{ini}$
$m = 1$
$e_{plus} = e_{plus}$
do while $m <= X_i$
    $e = e - e_{minus}$
    if $e > 0$ then
        set bit $x_{i,m}$ to $\delta$ where $\delta \notin \{0,1\}$
    else
        do
            select bit $x_{i,m}$
            $e = e + e_{plus}$
        while $e <= 0$
    end if
    $m = m + 1$
end do FIG 4
(PRIOR ART)
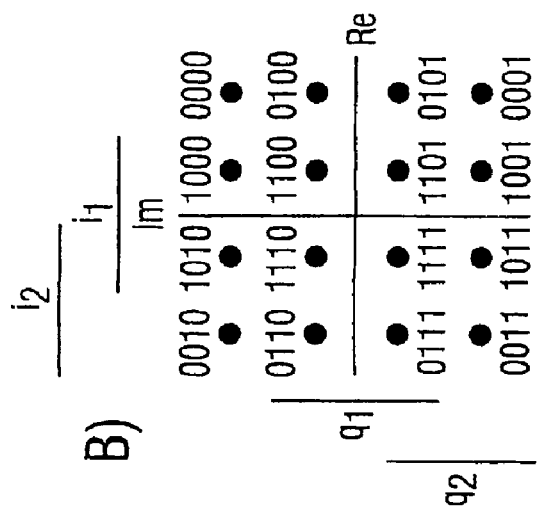
A)
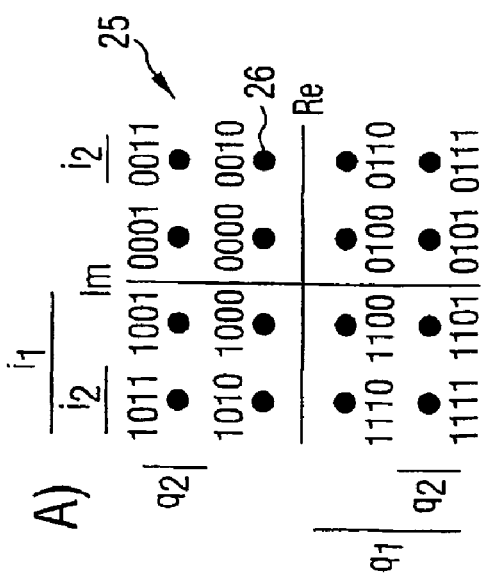
C)
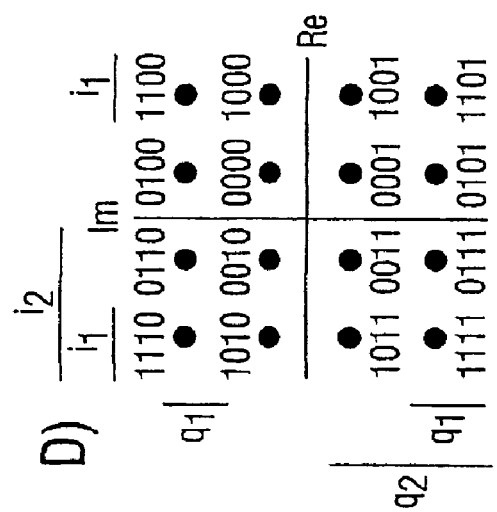
B)
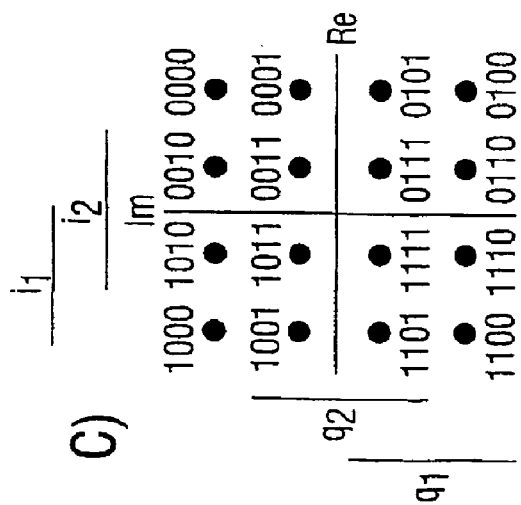
D)

METHOD AND DEVICE FOR TRANSFERRING DATA WHEREIN A BIT RATE ADAPTATION MODEL IS SIGNALED BETWEEN THE TRANSMITTER AND THE RECEIVER

This application is based on and hereby claims priority to PCT Application No. PCT/DE02/04745 filed on Dec. 27, 2002.

BACKGROUND

The present disclosure relates to a method and corresponding apparatus for transferring data according to an ARQ method, especially a hybrid ARQ method, in a communication system, such as a mobile radio system, for example The use of so-called "packet-access methods" or "packet-oriented data connections" is often recommended especially in connection with mobile radio systems, since the message types produced often have a very high burst factor with the result that only short periods of activity exist, interrupted by long breaks. Packet-oriented data connections may, in this case, considerably increase efficiency compared to other data transfer methods in which a continuous data stream is. This is because in data transfer methods with a continuous data stream, once a resource has been allocated, such as, for example, a carrier frequency or a time slot, it remains allocated during the entire communication relationship (i.e., a resource remains occupied even if there are momentarily no data transfers taking place, which means that this resource is not available for other network users). The result is that the narrow frequency range available for mobile radio systems is not used to the best effect.

Future mobile radio systems, such as, those that comply with the mobile radio standard UMTS (Universal Mobile Telecommunications System), for example, will offer a multitude of different services whereby multimedia applications will become increasingly prevalent alongside pure voice transmission. The diversity of services associated with this, with different transmission rates, requires a highly flexible access protocol on the air interface of future mobile radio systems. Packet-oriented data transmission systems have proved to be highly suitable in this context.

In connection with UMTS mobile radio systems, a so-called ARQ (Automatic Repeat Request) method has been proposed in packet-oriented data connections. In this method the data packets transferred from a transmitter to a receiver are checked for quality at the receiving end following decoding. If a data packet is erroneous on receipt, the receiver requests retransmission of this data packet by the transmitter (i.e., a repeat data packet that is identical or partially identical to the one previously sent and which was erroneous on receipt, is sent from the transmitter to the receiver (the terms full or partial repeat are used to indicate whether the quantity of data contained in the repeat data packet is less than or equal to that of the original data packet)). With regard to this ARQ method proposed for the UMTS mobile radio standard, which is also known as a hybrid ARQ method, the intention is for both data and so-called header information to be transmitted in a data packet, whereby the header information also contains information for error checking, (e.g., CRC (Cyclic Redundancy Check) bits), and can also be coded for error correction (known as FEC, Forward Error Correction).

In accordance with the current status of UMTS standardization, it is proposed that the bits in the individual data packets and/or repeat data packets be transferred following execution of a corresponding channel coding by means of QAM modulation (quadrature amplitude modulation). In this procedure the individual bits are mapped, via a process known as "gray mapping", onto corresponding QAM symbols which form a two-dimensional symbol area. This is problematic, since, in the proposed QAM modulation with alphabetic scope, which includes more than four QAM symbols, the reliability of the bits to be transferred varies considerably between the higher-value bits and the lower value bits. This is particularly disadvantageous with regard to the channel coding that is to be carried out, -since, for this-purpose, it is preferable to use turbocoders which require the reliability of the bits to remain consistent in order to achieve a sufficiently high level of efficiency. In a hybrid ARQ method, in which the repeat data packet is identical to the original data packet, the result of the aforementioned feature of variable bit reliability is that certain bits of the data packet and repeat data packet are to be found at the same place in the QAM symbol area, thus reducing the efficiency of the entire data transfer and limiting the data throughput at an early stage.

In order to resolve this problem it has previously been proposed that those bits which occur in the same place in the original data packet and in the repeat data packets be mapped to different QAM symbols in the QAM symbol area by dynamic rearrangement of the "gray mapping".

This will be explained in greater detail below with reference to FIGS. 4A-4D. FIG. 4A shows the signal constellation/QAM symbol area for a 16-QAM modulation, in which bits $i_1$ and i2 as well as $q_1$ and $q_2$ are mapped to a corresponding QAM symbol 26 of the two-dimensional QAM symbol area 25 in the sequence $i_1$ $q_1$ $i_2$ $q_2$. Each of the columns/rows of QAM symbol 26 in the two-dimensional QAM symbol area 25 that can be used for each bit $i_1$, $i_2$, $q_2$, $q_2$ is marked with a line. Thus, for example, the bit $i_1$="1" can only be mapped onto QAM symbols in the first two columns of the QAM symbol area. Thanks to "gray mapping" the reliability of the higher-value bit $i_1$ is greater than the reliability of the lower value bit $i_2$. In addition, the bit reliability of the bit $i_2$ fluctuates depending on the corresponding QAM symbol 26 transferred (i.e., depending on whether the corresponding QAM symbol 26 is arranged in the outer left or outer right column of the QAM symbol area 25). The same applies for bits $q_1$ and $q_2$, since bits $q_1$ and q2 are mapped in a manner equivalent to the mapping of bits $i_1$ and $i_2$ (albeit orthogonally for this purpose).

According to the conventional methods explained on the basis of FIGS. 4A-4D, it has been proposed that a different "gray mapping" be used for repeat data packets than the one used for the original data packets. Thus, for example, the "gray mapping" illustrated in FIG. 4B can be used for a first repeat data packet, while a "gray mapping" as shown in FIG. 4C is used for a second repeat data packet, and a "gray mapping" as shown in FIG. 4D can be used for a third repeat data packet. Comparison of FIGS. 4A-4D clearly shows that different QAM symbols 26, i.e., different points in the two-dimensional QAM symbol area 25, are mapped to one and the same bit combination $i_1$ $q_1$ $i_2$ $q_2$. This dynamic variation of the "gray mapping" may, for example, continue to the extent that, after a certain number of repeats, each bit $i_1$, $i_2$, $q_1$ and $q_2$ is transferred to a place in the QAM symbol area 25 with excellent or good reliability or poor reliability, whereby this procedure can be optimized for a different number of repeats.

It may be seen from FIGS. 4A-4D that this procedure is relatively costly since the "gray mapping" process must be modified for each repeat data packet.

SUMMARY

The present disclosure proposes a method and a corresponding apparatus for transferring data according to an ARQ method, in which the problem explained above (i.e., that of achieving reliable data transfer with high data throughput) may be resolved by simple means.

The presently disclosed methods and apparatus are, in particular, based on the concept of signaling and/or transferring the bit rate adaptation model to be used for bit rate adaptation (e.g., the parameters required for calculating this bit rate adaptation model) between a transmitter and receiver in order to retrieve the transferred information with good quality at the receiving end.

Depending on the disclosed examples, the signaling of the bit rate adaptation model or the transfer of the parameters required in order to calculate this bit rate adaptation model is carried out from the transmitter to the receiver or vice versa.

In particular, one bit may be provided for this signaling of the bit rate adaptation model, and this bit, for example, may be transferred with the corresponding data packet or as part of the corresponding data packet, and indicates whether the data packet is a self-decoding or a non-self-decoding data packet depending on whether this bit is occupied by a "1" or a "0", for example.

Assuming an optimum channel is used, self-decoding data packets contain so many systematic bits that the data packet can be decoded at the receiving end solely on the basis of the bits in the data packet. In particular, a self-decoding data packet may contain all systematic bits.

The disclosed method and apparatus are also based on the finding that, if bits are repeated (at least some of the bits in the data packet are transferred within the data packet more than once), all systematic bits are always transferred and, therefore, the data packet is always self-decoding. Thus, in this case any signaling as to whether the data packet is self-decoding or non-self-decoding is superfluous and the transmission resource provided for this purpose, such as, for example, the aforementioned bit, may be used for other purposes. In particular, this transmission resource may be used for signaling of bit rate adaptation models to be used for bit rate adaptation, especially for transferring the parameters required for calculating these bit rate adaptation models. As a result it may be possible, where bits are repeated, to signal a greater number of different rate adaptation models for self-decoding data packets than if bits are punctured.

In general the disclosed method and apparatus achieve data transfer according to an ARQ process to become more flexible and the transfer resources available to be used more effectively.

A development of the disclosed method and apparatus is based on the concept of applying different rate adaptation models, i.e., different puncturing or repetition models, to the individual bits of the original data packet and of the individual repeat data packets, so that bits with an identical information source (i.e., all bits with an identical information source) are transferred from the transmitter to the receiver after bit rate adaptation has been carried out in different places in the data packet and in the repeat data packet.

As a result, the corresponding bits become located at different places in each data packet even before the QAM modulation is carried out, and are, thus, mapped to different points or QAM symbols in the QAM symbol area without modification of the "gray mapping".

Moving the rate adaptation model between the originally transmitted data packet on the one hand to the subsequent repeat data packet or packets on the other, means that one and the same code rate is obtained. It also means, however, that the transmission quality and the bit error rate can be improved. In this way an even distribution of reliability in the bits to be transferred between the data packets and the subsequent repeat data packets is achieved, so that an efficient channel coding procedure, for example using turbocoders, can be carried out, the overall result being that a sufficiently high level of efficiency in information or data transfer is achieved while at the same time a high data throughput is guaranteed.

If several repeat data packets are requested it is advantageous to use whichever rate adaptation model was applied (i.e., the appropriate puncturing/repetition model is applied) being moved from repeat data packet to repeat data packet).

In a further example, a rate adaptation algorithm known per se is provided for the purpose of bit rate adaptation, whereby an offset value used according to this rate adaptation algorithm, and which essentially determines the rate adaptation model to be used in each case, varies between the original data packet and the repeat data packet or between the individual repeat data packets. The variation of this offset value may enable a more efficient coding to be achieved than in a conventional hybrid ARQ method.

The channel-coded bit stream may preferably be separated into several parallel partial bit streams (in a process known as bit separation) for this purpose, whereby rate adaptation models that are independent of one another, i.e., with independent puncturing or repetition of bits, are applied to the individual partial bit streams, so that, once the corresponding bits of this partial bit stream have finally been combined (in a process known as bit collection), the required bit rate adaptation can be achieved, with the different offset value, with regard to the original data packet and the individual repeat data packets. The separation of the bit stream into several parallel partial bit streams enables a particularly high degree of flexibility to be achieved in channel coding.

Since the corresponding receiver of the data packets or repeat data packets thus processed ought to know which offset value was used, and since any explicit transfer of this offset value may be disadvantageous, the offset value may, for example, be modified synchronously with the corresponding time slot and/or with the corresponding frame, so that the receiver may infer the offset value used in each case directly from the time slot and/or frame received. In a different embodiment of the invention, this offset value is to be signaled between the transmitter and the receiver.

In the bit separation process explained above, involving the separation of the bits into several parallel partial bit streams, in the final bit collection the different parallel partial bit streams may also be combined with one another proportionately for each data packet or repeat data packet, whereby this process may be used to particularly advantageous effect if bit repetition is applied. The offset value explained above may be adjusted for the original data packet and the individual repeat data packets such that the moving together of the resulting rate adaptation models is maximized and/or as many as possible of the matching bits in the original data packet or the corresponding repeat data packet are mapped onto different points in the two-dimensional symbol area during the final modulation.

The method described above functions optimally if the bits are mapped onto the required modulation symbol area immediately after rate adaptation has been carried out. However, this is not always the case since a process called interleaving, whereby the bits are chronologically rearranged, often takes place between rate adaptation and modulation. In a random interleaver, neighboring bits would be distributed randomly to the corresponding points or symbols in the two-dimensional symbol area, so that movement by one bit, which can be achieved by varying the offset value as described above, would also result in a random modification of the points or symbols of the two-dimensional symbol area. However, this would not be ideal since it is best for the allocation to be modified such that a bit that is less reliable during transmission of the original data packet is mapped, in a repeat data packet to be transferred subsequently, to a position with higher reliability in the modulation symbol area (e.g., the QAM symbol area) and vice versa, while in a random rearrangement, only approximately 50% of the maximum potential gain might be achieved.

For this reason it is preferable for a highly regular interleaver, (e.g., a block interleaver) to be used for interleaving. Additionally, the number of columns to which the interleaver distributes the bits, with subsequent column rearrangement or column permutation, and the number of points or symbols of the symbol area used that are differently weighted or have different levels of reliability, should be coprime, so that optimum mapping is achieved.

This variation of the disclosed methods and apparatus is considerably far less complex compared to the known method explained previously.

BRIEF DESCRIPTION OF THE DRAWINGS

FIGS. 4A-4D are diagrams for clarifying the mapping of bits from an originally transmitted data packet or from corresponding repeat data packets to QAM symbols.

DETAILED DESCRIPTION OF THE PRESENT EXAMPLES

Figures 2, 3:
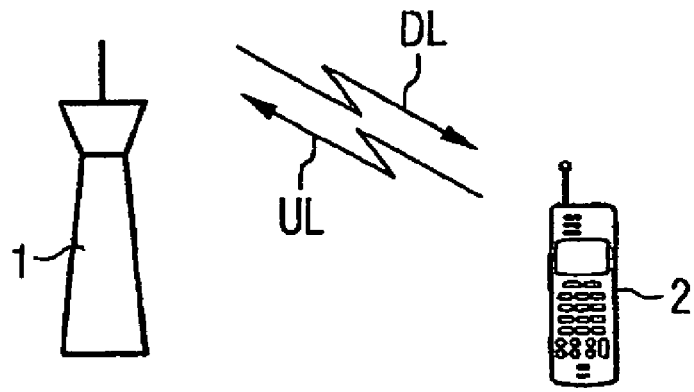
FIG. 2 is a diagram for clarifying the communication in a mobile radio system.
FIG. 3 shows a rate adaptation algorithm, that may be used in the disclosed examples for the purpose of rate adaptation.

As already explained, the following is based on the idea that packet-oriented data transfer in a mobile radio system, as shown schematically in FIG. 2 for example, is to be implemented with the help of the disclosed methods and apparatus. Thus, for example, FIG. 2 shows the communication between a base station 1 and a mobile station 2 of a mobile radio system, such as a UMTS mobile radio system, for example. The transfer of information from the base station 1 to the mobile station 2 takes place via the so-called downlink channel DL, while the transfer of information from the mobile station 2 to the base station 1 takes place via the so-called uplink channel UL.

The disclosed methods and apparatus are explained below using as an example a packet-oriented data transfer from the base station 1 to the mobile station 2, i.e., a packet-oriented data transfer via the downlink channel, in which the disclosed method and apparatus can also be used similarly on data transfer via the uplink channel. These methods and apparatus are further explained below on the basis of the signal processing measures to be executed in the transmitter concerned. However it is noted that a corresponding signal processing operation in the reverse sequence is required in the relevant receiver for evaluation of the data processed in this way at the transmitter end, which means that not only the transmitter end is affected, but also the receiver end.

Figure 1:
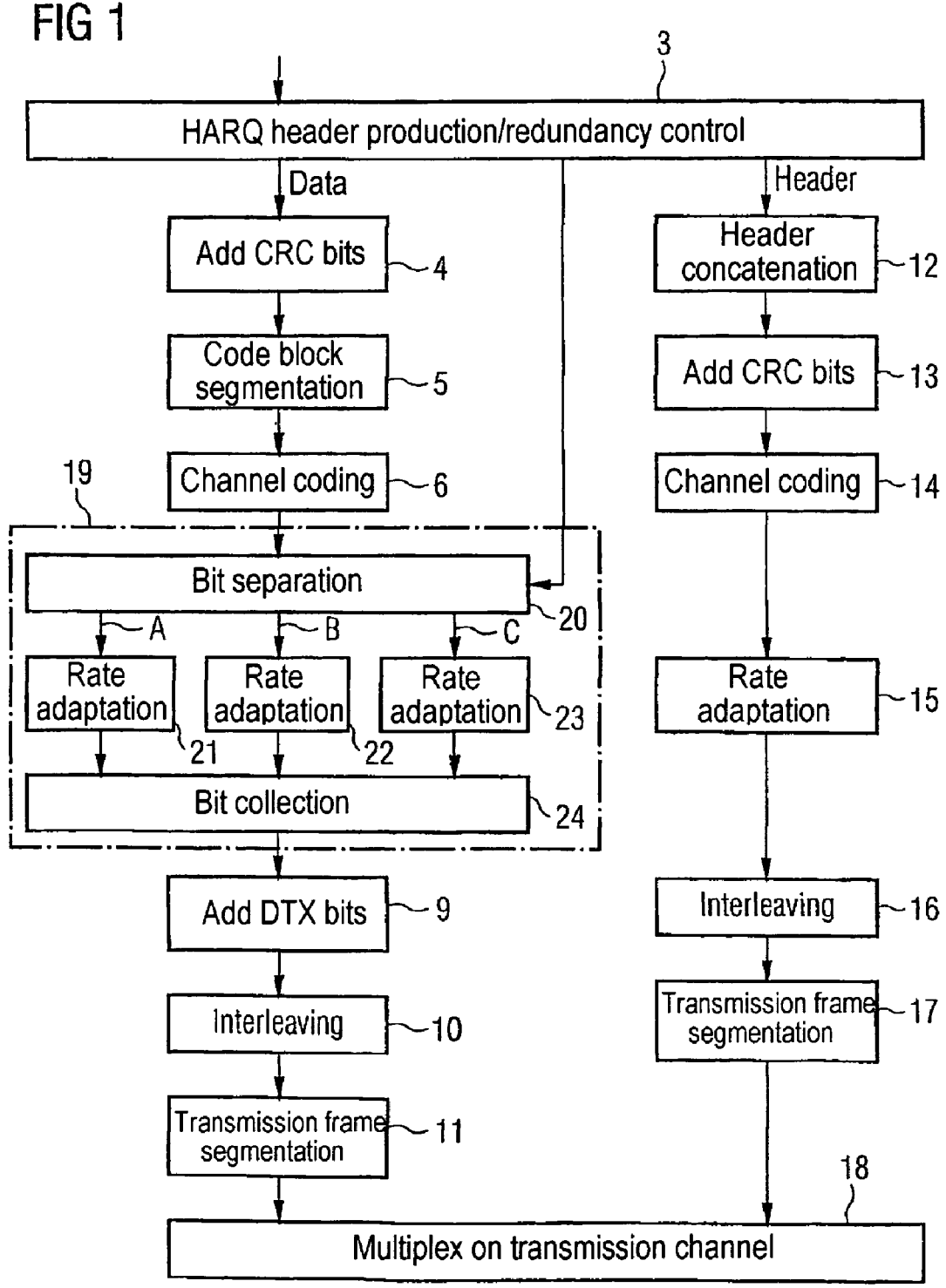
FIG. 1 is a diagram for clarifying signal processing according to a disclosed packet-oriented ARQ method.

FIG. 1 shows the signal processing of the data and header information to be transferred in data packets following a exemplary hybrid ARQ method.

On the header side, header information created by a function block 3 is supplied to a function block 12, which ensures that all headers of all data packets that are to be transmitted in the same radio packet are linked together into a single header (in a process known as header concatenation). A function block 13 inserts CRC bits for header detection into the resulting header information. The resulting bit stream is then subjected to channel coding by a function block 14 and rate adaptation by a function block 15. An interleaver, 16, causes the symbols and/or bits supplied to it to be arranged in a particular way and time-interleaved. The data blocks produced by the interleaver 16 are allocated by a function block 17 to the individual transmit or radio frames (known as radio frame segmentation).

A function block 4 is also provided on the data side for the insertion of CRC bits. A function block 5 is used for splitting the data supplied to a channel coder 6 such that a coding process limited to a specific number of bits can always be carried out by the channel coder 6.

Because of the channel coding carried out by the channel coder 6, the actual data to be transmitted has redundant information inserted in it. Systematic bits and parity bits are systematically produced by the channel coder, whereby each systematic bit is identical to an information bit and parity bits are redundant bits that are determined from the information bits. In an ARQ method, consecutively transmitted data packets contain bits with the same information source, i.e., bits that each depend on the same information bit.

The bits produced by the channel coder 6 are supplied to a function block 19, which adjusts the bit rate of the bit stream by masking or omitting individual bits (known as puncturing) or repeating individual bits. So-called DTX (Discontinuous Transmission) bits can be inserted into the data stream by a subsequent function block 9. Also provided on the data side are function blocks 10 and 11, which perform the same functions as do function blocks 16 and 17 on the header side.

Finally the bits produced on the data and header side are mapped or multiplexed by a function block 18 on whatever physical transfer or transmission channel is available at the time and transferred to the receiver with the help of a suitable modulation procedure, such as QAM modulation, for example.

In the hybrid ARQ method, if a data packet is incorrectly received or decoded by the receiver, a repeat data packet is requested. The repeat data packet is identical or partially identical to the previously sent and incorrectly received packet (HARQ type I, Chase Combining). The latter methods are known as partial incremental redundancy (IR) or as HARQ type III. As a further option the repeat packets may also consist purely of additional redundant information known as parity bits (full IR or HARQ type II).

The terms full or partial repeat are used to indicate whether the quantity of data contained in the repeat data packet is less than or equal to that of the original data packet. The data packet and the corresponding repeat data packet have at least some bits with the same information source. Therefore, by evaluating the data packet originally sent together with the subsequent repeat data packets requested, the receiver can retrieve the originally transmitted information with better quality.

The function section 19 includes a function block 20, which, dependent upon control exercised by the function block 3, separates the coded bits produced by the upstream channel coder 6 into at least two parallel partial bit streams, which are each subjected to rate adaptation separately (i.e., independently of one another). In this regard FIG. 1 shows three partial bit streams A-C, each of which has one function block 21-23 provided for rate adaptation as appropriate (i.e., for puncturing or repetition of individual bits). This results in several differently coded parallel partial bit streams, which are supplied to a further function block 24. This further function block 24 has the task of bit collection (i.e., collecting the individual bits from the parallel bit streams in the same sequence that was used by function block 20 for the bit separation process, such as the separation into the individual parallel partial bit streams). This is to ensure that the sequence of bits remaining after rate adaptation remains unchanged overall.

As already explained, the rate adaptation processes provided for the individual partial bit streams A-C by function blocks 21-23 may take place completely independently of one another. In particular, it is also possible for the bits from one or more bit streams not to be subjected to any puncturing or repetition at all. In general the rate adaptation process for the individual parallel partial bit streams A-C should be selected such that a required rate adaptation model is applied by the entire function section 19 to the channel-coded bit stream produced by function block 6 for each data packet or repeat data packet. By implementing function section 19 with several rate adaptations in parallel as shown in FIG. 1, extremely high flexibility can be achieved in the coding process.

The function section 19 is designed such that, according to the control exercised by the function block 3, it applies a different rate adaptation model to the bits of a repeat data packet than to the bits in the corresponding, originally transmitted, data packet. This means that function section 19 is notified by function block 3 as to whether a repeat data packet has been requested by the corresponding receiver, whereby function section 19 in this case selects and/or adjusts the rate adaptation model implemented by the individual function blocks 21-23, such that the bits of the repeat data packet are processed overall with a different rate adaptation model than the bits of the basic data packet that was originally transmitted.

The rate adaptation process implemented overall by the function section 19 may, for example, be carried out according to the rate adjustment algorithm shown in FIG. 3, which is already known in the conventional art.

For example, a rate matching (i.e., rate adaptation) algorithm contained in the UMTS standard is described in "Multiplexing and Channel Coding (FDD) Release 1999, "Technical Specification 3GPP TS 25.212. The algorithm uses the following as the main parameters:

$x_b$: number of coded bits per packet in bit stream b $e_{ini}$: starting error value (NTTI/3)

$e_{plus}$: increment in the error value during puncturing/repetition $e_{minus}$: decrement in the error value per output bit.

In the existing standard (e.g., for the downlink of turbocoded transport channels with fixed bit position (See, e.g., Chapter 4.2.7.2.1 of the above cited UMTS Standard), these parameters are to be calculated as follows in cases of puncturing:

$$e_{ini} = N_{max} \quad (5.1)$$

where $N_{max}$ refers to the maximum number of bits per parity bit stream via all transport formats and transport channels, calculated before rate adaptation. The increments and decrements in the error values are calculated as follows:

$$e_{plus} = a \times N_{max}, \; e_{minus} = a \times |\Delta N_i^b| \quad (5.2),$$

where a=2 for the first parity bit stream and a=1 for the second parity bit stream. $|\Delta N_i^b|$ is the number of punctured bits per bit stream b for the transport channel i.

In particular, a rate adaptation parameter $e_{ini}$ is used which indicates an offset value with regard to the rate adaptation model used for each rate adaptation carried out. An error variable e is initialized with this offset value $e_{ini}$ at the beginning of the rate adaptation algorithm shown in FIG. 3, whereby the error e indicates for example the ratio between the current puncturing rate and the required puncturing rate in the case of puncturing.

Finally the index m of the bits currently to be processed is set to the first (i.e., to the value 1) and an auxiliary error parameter eplus is initialized. A loop is then run for all bits in the data packet No. i to be processed, whereby the number of bits for the data packet in question is indicated by $x_i$.

Within this loop, first the error e is repeated and checked using a further auxiliary error parameter $e_{minus}$, to ascertain whether the resulting error e is greater than zero, in order to determine whether or not the corresponding bit is to be punctured. If the above condition is fulfilled, the corresponding bit is set to an auxiliary value δ and is punctured (i.e., blocked for the subsequent data transfer). If, however, the above condition is not fulfilled, the corresponding bit is selected for the data transfer and the error e is calculated again using the first auxiliary error parameter mentioned above, namely, $e_{plus}$.

At the conclusion of the rate adaptation algorithm or puncturing algorithm, the bit index m is incremented and, thus, the next bit is selected for processing as explained above.

The rate adaptation model applied to the bits in a data packet or repeat data packet can essentially be affected by appropriate selection of the offset value $e_{ini}$. By varying this offset value $e_{ini}$ it is possible for a different rate adaptation model to be applied to a repeat data packet than was applied to the corresponding, originally transmitted, data packet, whereby the rate adaptation may be applied in particular with reference to the parity bits of the individual partial bit streams A-C (compare FIG. 1).

The offset value $e_{ini}$ is selected for the originally transmitted data packet and the repeat data packet, such that the moving together of the resulting rate adaptation models is maximized. Furthermore the offset value $e_{ini}$ for the originally transmitted data packet and the repeat data packet is to be advantageously selected so that during the final modulation, in particular the QAM modulation, as many of the matching bits in the two packets as possible are mapped onto different points (i.e., different QAM symbols), of the corresponding two-dimensional QAM symbol area (compare in this regard the mappings shown in FIG. 4, for example).

A self-decoding data packet is normally used for the first transfer, (i.e., all systematic bits are transferred, for example). If, once these systematic bits are subtracted, there is only sufficient space remaining in the transfer for some of the parity bits, the parity bits are punctured accordingly (i.e., not transferred). However, if the available space is greater than all existing parity bits, then systematic bits and parity bits are repeated with the same rate. The selection of punctured/repeated bits takes place in UMTS by means of an algorithm which distributes these punctured/repeated bits as evenly as possible within the coded data block.

In a repeat data transfer, the rate adaptation model and, thus, the bits to be transferred in each case, are selected on the basis of a specific number of signaling bits, such that, firstly, different HARQ types are implemented, and, secondly, the bits transferred in each transfer are as different as possible, in order to achieve a decoding gain and/or even distribution of the total energy to all bits. A specific rate adjustment model or the parameters for calculating a specific rate adaptation model here correspond to a specific redundancy version. A variant of this shows how the selection of redundancy versions can be optimized for a given number of bits for signaling of the various redundancy versions, both in the case of puncturing, and also in the case of repetition, in particular.

To enable the receiver to interpret the received data packet correctly, a signal is sent between the transmitter and the receiver to indicate whether the data packet is a self-decoding or a non-self-decoding data packet. Bit signaling information is required for this purpose. Within either type (self-decoding or a non-self-decoding), further redundancy versions can then be defined, which can likewise be explicitly signaled. If n bits are available for signaling, then the total amount of information to be signaled consists of one bit for differentiating between self-decoding and non-self-decoding, and n−1 bits for describing a specific redundancy version from a multitude of redundancy versions.

Use of Signaling bits

| Self-decoding data packet | 1 bit |
|---|---|
| Redundancy version | n − 1 bits |

However, differentiation between self-decoding and non-self-decoding data packets is worthwhile only in the case of puncturing, in which not all coded bits can be transferred. In the case of repetition, self-decoding exists, a priori, since all coded bits can indeed be transferred several or even many times over. In the case of repetition, therefore, it is advantageous to use all n bits in order to differentiate between different redundancy versions. Particularly in the case of repetition, even where n is a small number, this makes it possible to ensure, with far greater certainty, that the power is distributed as evenly as possible over all transferred bits after a repeat data packet is transferred and the first data packet is overlaid with the repeat data packet at the receiving end. An exemplary embodiment of the use of the signaling bits according to the invention is shown in the following table:

Use of Signaling Bits in Puncturing and Repetition

|  | Puncturing | Repetition |
|---|---|---|
| Self-decoding data packet | 1 bit | 0 bits |
| Redundancy version | n − 1 bits | n bits |

For example, the value n=3 might be selected here. This permits a reasonable number of different redundancy versions and, furthermore, does not require an unnecessarily high number of signaling bits.

The method presented here optimizes the signaling process since the significance of the signaling bits depends on whether bits are repeated or punctured in the transfer in question. If a total of Ng signaling words is provided (i.e., Ng=2n where n bits are provided for signaling), then the Ng signaling words are distributed as follows.

In the case of puncturing, the signaling words are divided into two partial quantities; one for transfers of the self-decoding type (i.e., systematic bits are included); and a second for transfers of the non-self-decoding type (systematic bits are not usually included, and in particular, systematic bits are not included). Within these partial quantities, then, different signaling words differentiate between different redundancy versions.

Ns redundancy versions of the self-decoding type (e.g., Partial Incremental Redundancy) are selected, which indicate self-decoding redundancy versions, and Ng-Ns redundancy versions of the non-self-decoding type (Full Incremental Redundancy) are provided. If Ns=Ng/2, the coding already provided is used. Another extreme case is Ns=1. In this case, only a single self-decoding redundancy version is provided (which is provided for the initial transfer) and Ng−1 non-self-decoding redundancy versions. This is the best choice where Ng is relatively small (maximum 8), since it still enables a relatively high number of redundancy versions with full IR to be defined.

In the case of repetition, no partial quantities are formed and all signaling words are used to differentiate between various redundancy versions.

The main innovations in this exemplary embodiment are the differentiation of cases of repetition and puncturing for the significance of the signaling bits and the optimization of the number of possible HARQ types and different redundancy versions, -and, in the case of repetition as well as for-puncturing, with a specified number of signaling bits. Different redundancy versions may be generated according to a parameter variation of the parameter $e_{ini}$, but may also be generated according to any other procedure.

Until now, the only parameters that have been described are those that influence the rate adaptation or the bit selection for an HARQ system, and the way in which such parameters can be signaled. In fact, however, it is by varying other parameters that improvements in the transfer rate are achieved. An example of such a parameter is the variation in the mapping of bits to 16 QAM symbols in the stage for mapping modulation symbols. The principle of this method is described in the following standardization documents, by way of example:

R1-01-0237, Panasonic,"Enhanced HARQ Method with Signal Constellation Rearrangement, "3GPP TSG RAN WG1, Las Vegas, USA, Feb. 27-Mar. 2, 2001; and R1-01-1059, Pasonomic, "Comparison of HARQ Schemes for 16-QAM, "3GPP TSG RAN WG1, Sophia Antipolis, France, Nov. 5-7, 2001; R1-01-0151, Panasonic, "16-QAM F+HARQ Bitmapping Scheme", Espoo, Finland, January, 2002.

This method essentially achieves good results if the same redundancy version is used in repetition (chase combining) or if the redundancy versions differ only slightly in terms of their bit content. In contrast, incremental redundancy achieves the best results if the individual redundancy versions transmitted differ greatly. Ideally, therefore, the signaling should be designed such that different redundancy versions as well as different mapping variants are used for bitmapping to 16 QAM symbols. However, this is not always possible because of the limited availability of signaling bits. In this case it is necessary to decide whether the signaling bits are used for selecting redundancy versions or selecting mapping variants. Embodiments for these exemplary variants are explained below. In an initial exemplary embodiment with reference to this aspect, no mapping variants—but exclusively redundancy versions—are signaled if the modulation type used is not 16 QAM or 8 PSK, or a higher-value modulation, but only BPSK, QPSK, or a different modulation type which does not have different values for modulation symbols.

In a further exemplary embodiment, for example if a 16 QAM modulation is used, it is preferable for mapping variants to be signaled—if necessary at the expense of redundancy versions—if so many bits are available for transfer that all the bits present can be transferred, in other words if puncturing does not need to be used for rate adaptation.

In a further exemplary embodiment, it is preferable for mapping variants to be signaled (if necessary at the expense of redundancy versions), if fewer bits are available for transfer, so that not all the bits present can be transferred, in other words puncturing must be used for rate adaptation if the puncturing rate, i.e. the proportion of bits to be punctured, does not exceed a certain predefined value. In principle this predefined value may be selected at random, but it is better if it is not lower than 50%, since, with 50% puncturing by selection of two completely orthogonal (i.e. disjunct) redundancy versions, an excellent improvement can be achieved through incremental redundancy. Otherwise it is not possible, in this case, to achieve any additional gain through mapping variations, since the two transfers do not contain any common bits in which a gain might be produced. In this case, therefore, it is not absolutely necessary to signal mapping variations in addition to redundancy versions.

In a further exemplary embodiment, the aforementioned exemplary embodiments may be expanded such that there is no firm switching to and from between signaling formats depending on the parameters described above, but that more or fewer redundancy versions or mapping variants are signaled according to parameter. There follows an example of a case in which a total of four alternatives might be signaled:

If the puncturing rate is more than 50%, all four alternatives are used for the signaling of redundancy versions and no mapping variants are signaled.

If the puncturing rate is between 50% and 33%, 3 alternatives are used for the signaling of redundancy versions and one alternative is signaled for a mapping variant (which can then only be used for a special redundancy version).

If the puncturing rate is between 33% and 20%, two alternatives (i.e. one bit) are used for the signaling of redundancy versions and likewise two alternatives (i.e. one bit) are signaled for two mapping variants. This enables the redundancy version and mapping variant to be selected independently of one another.

If the puncturing rate is between 20% and 10%, an alternative is used for signaling a redundancy version (which can then only be used for a special mapping version), and three alternatives are used for mapping variants.

If the puncturing rate is less than 10% with repetition up to 33%, all four alternatives are used for the signaling of mapping variants and no redundancy versions are signaled.

If the repetition rate is over 33%, then two alternatives (i.e. one bit) are again used in each case for the signaling of redundancy versions and mapping variants. This enables the redundancy version and mapping variant to be selected independently of one another.

In the above exemplary embodiments the ratio of bits available for transfer to bits present, and the resulting puncturing or repetition rate, has been used as a criterion. It is necessary to point out that, even though this puncturing rate may well be the puncturing rate that results from the ratio of number of bits after channel coding to number of bits that are transferred, there may be cases in which further interim stages are carried out. For example, puncturing may be carried out first on an interim number of bits that corresponds to the size of a receiving memory, and it is only from this number that puncturing or repetition is carried out on the number of bits to be transferred. In this case the criterion would preferably be the puncturing rate/repetition rate in this second stage, not the overall rate.

According to another example, an interleaver is used for the function block 10 shown in FIG. 1, which does not interleave randomly but in a highly regular manner. A block interleaver, for example, might be used for function block 10. If the interleaver used as function block 10 is a highly regular interleaver, and if the number of columns to which the interleaver distributes the bits supplied to it and the number of differently weighted points in the two-dimensional QAM symbol area or the number of differently weighted modulation points in general, are coprime, the result is optimum mapping. According to the current state of UMTS standardization, the proposed interleaver is a block interleaver with additional column replacement, which distributes neighboring bits to columns separated from one another in multiples of "5", and then exchanges the columns. For example, if 30 columns are used the column permutation is as follows: column no. 0, 20, 10, 5, 15, 25, 3, 13, 23, 8, etc. Since the value "5" is coprime with the number of different bits, for example in a 16-QAM modulation (i.e., two bits) and a 64-QAM modulation (i.e., three bits), then this combination, for example, results in good scrambling or mapping to the corresponding modulation points.

This method as described above is possible for both puncturing and repetition, as well as for the most diverse transport formats. By appropriately selecting the parameters (e.g. number of redundancy versions, number of bit streams), it can be adapted to different modulation and coding schemes.

It should be understood that various changes and modifications to the presently preferred examples described herein will be apparent to those skilled in the art. Such changes and modifications can be made without departing from the spirit and scope of the present invention. It is therefore intended that such changes and modifications be covered by the appended claims.

The invention claimed is:

1. A method for transferring data according to an ARQ methodology comprising:

transferring data is transferred from a transmitter to a receiver in the form of data packets wherein at least one repeat data packet is transferred by the transmitter to the receiver after transmission of a data packet when a corresponding request is issued by the receiver, and the bits to be transferred in the data packet and at least one repeat data packet are subjected to bit rate adaptation before they are transferred from the transmitter to the receiver;

utilizing one or more bit rate adaptation models for bit rate adaptation, including using parameters of the one or more bit rate adaptation models for calculation of the bit rate adaptation; and signaling at least one of the one or more bit rate adaptation models from the transmitter to the receiver for use in differentiating between self-decoding and non-self-decoding data packets.

2. A method as defined in claim 1, wherein the differentiation according to self-decoding and non-self-decoding data packets is signaled only in the case of puncturing, but not in the case of repetition.

3. A method as defined in claim 1, wherein at least two different bit rate adaptation models are signaled.

4. A method as defined in claim 1, wherein a total number of possible signaled bit rate adaptation models for self-decoding or non-self-decoding data packets in the case of puncturing is the same as the number in the case of repetition.

5. A method as defined in claim 1, wherein for cases of puncturing, one bit is provided for indicating a self-decoding or non-self-decoding data packet and n−1 bits are provided for indicating different bit rate adaptation models, and, in cases of repetition, n bits are provided for indicating different bit rate adaptation models.

6. A method as defined in claim 1, wherein two bits are provided in cases of puncturing, and three bits are provided in cases of repetition to indicate different bit rate adaptation models.

7. A method as defined in claim 1, wherein different bit rate adaptation models are used for bit rate adaptation of the data packet and the repeat data packet, so that bits with an identical information source are transferred from the transmitter to the receiver after bit rate adaptation is carried out at different places in the data packet and in the repeat data packet.

8. A method as defined in claim 1, further comprising:

dividing the bits of a channel-coded bit stream into two or more partial bit streams;

subjecting each individual partial bit stream to a separate bit rate adaptation process for the purpose of bit rate adaptation; and recombining the bits of the individual partial bit streams with one another after the corresponding bit rate adaptation for the data packet or repeat data packet has been carried out.

9. A method as defined in claim 8, further comprising:

combining the bits of the individual partial bit streams with one another proportionately after the corresponding bit rate adaptation for the data packet or repeat data packet has been carried out.

10. A method as defined in claim 1, wherein the bit rate adaptation model used for the repeat data packet is modified compared to the bit rate adaptation model used for the data packet, in that when a QAM modulation of the bits to be transferred is carried out, bits with identical information content are mapped with regard to the repeat data packet onto different points in the QAM signal area than for the originally transmitted data packet.

11. A method as defined in claim 1, wherein bit rate adaptation is carried out with the aid of a bit rate adaptation algorithm, which punctures or repeats the bits of the data packet or repeat data packet depending on the value of a corresponding rate adaptation parameter ($e_{ini}$), whereby the value of the rate adaptation parameter ($e_{ini}$) is modified for the bit rate adaptation of the bits in the repeat data packet compared to the bit rate adaptation of the bits in the data packet.

12. A method as defined in claim 11, wherein the bit rate adaptation algorithm is configured such that it selects the bits to be punctured or repeated using an error variable (e), whereby said error variable (e) is initialized with the value of the rate adaptation parameter ($e_{ini}$) at the start of the rate adaptation algorithm.

13. A method as defined in claim 1, wherein different bit rate adaptation models are used when several repeat data packets are requested by the receiver for bit rate adaptation of the bits in the individual repeat data packets.

14. A method for transferring data according to an ARQ methodology comprising:

transferring data from a transmitter to a receiver in the form of data packets, wherein at least one repeat data packet is transferred to the receiver by the transmitter after transmission of a data packet when a corresponding request is issued by the receiver;

subjecting bits to be transferred in the data packet or the at least one repeat data packet to bit rate adaptation by puncturing or repetition before they are transferred from the transmitter to the receiver, wherein the bit rate adaptation is carried out according to a bit rate adaptation model; and signaling the bit rate adaptation model, including parameters for calculating the bit rate adaptation model, from the transmitter to the receiver, wherein a signal is sent from the transmitter to the receiver to indicate whether the data packet is self-decoding or non-self-decoding when bit rate adaptation is accomplished by puncturing.

15. A method as defined in claim 14, wherein no signal is sent from the transmitter to the receiver to indicate whether a data packet is self-decoding or non-self-decoding when the bit rate adaptation is accomplished by repetition.

16. A method as defined in claim 14, wherein a transmission resource used in the case of puncturing in order to signal whether a self-decoding or non-self-decoding data packet is being transferred, is alternately used in the case of bit rate adaptation accomplished by repetition to signal from the transmitter to the receiver the bit rate adaptation model, including parameters for calculating the bit rate adaptation model.

17. A method as defined in claim 14, wherein at least two different bit rate adaptation models are signaled.

18. A method as defined in claim 14, wherein a total number of possible signaled bit rate adaptation models for self-decoding or non-self-decoding data packets in the case of puncturing is the same as the number in the case of repetition.

19. A method as defined in claim 14, wherein for cases of puncturing, one bit is provided for indicating a self-decoding or non-self-decoding data packet and n−1 bits are provided for indicating different bit rate adaptation models, and, in cases of repetition, n bits are provided for indicating different bit rate adaptation models.

20. A method as defined in claim 14, wherein two bits are provided in cases of puncturing, and three bits are provided in cases of repetition to indicate different bit rate adaptation models.

21. A method as defined in claim 14, wherein different bit rate adaptation models are used for bit rate adaptation of the data packet and the repeat data packet, so that bits with an identical information source are transferred from the transmitter to the receiver after bit rate adaptation is carried out at different places in the data packet and in the repeat data packet.

22. A method as defined in claim 14, further comprising:
dividing the bits of a channel-coded bit stream into two or more partial bit streams;
subjecting each individual partial bit stream to a separate bit rate adaptation process for the purpose of bit rate adaptation; and
recombining the bits of the individual partial bit streams with one another after the corresponding bit rate adaptation for the data packet or repeat data packet has been carried out.

23. A method as defined in claim 14, further comprising:
combining the bits of the individual partial bit streams with one another proportionately after the corresponding bit rate adaptation for the data packet or repeat data packet has been carried out.

24. A method as defined in claim 14, wherein the bit rate adaptation model used for the repeat data packet is modified compared to the bit rate adaptation model used for the data packet, in that when a QAM modulation of the bits to be transferred is carried out, bits with identical information content are mapped with regard to the repeat data packet onto different points in the QAM signal area than for the originally transmitted data packet.

25. A method as defined in claim 14, wherein bit rate adaptation is carried out with the aid of a bit rate adaptation algorithm, which punctures or repeats the bits of the data packet or repeat data packet depending on the value of a corresponding rate adaptation parameter ($e_{ini}$), whereby the value of the rate adaptation parameter ($e_{ini}$) is modified for the bit rate adaptation of the bits in the repeat data packet compared to the bit rate adaptation of the bits in the data packet.

26. A method as defined in claim 25, wherein the bit rate adaptation algorithm is configured such that it selects the bits to be punctured or repeated using an error variable (e), whereby said error variable (e) is initialized with the value of the rate adaptation parameter ($e_{ini}$) at the start of the rate adaptation algorithm.

27. A method as defined in claim 14, wherein different bit rate adaptation models are used when several repeat data packets are requested by the receiver for bit rate adaptation of the bits in the individual repeat data packets.

28. An apparatus to transfer data according to an ARQ method comprising:
a transmitter configured to transfer data to a receiver in the form of data packets, wherein the transmitter is configured such that, after transmission of a data packet, the transmitter transfers a repeat data packet to the receiver when a corresponding request has been received from the receiver; and
a bit rate adaptation unit configured to apply bit rate adaptation to bits to be transferred in the data packet or repeat data packet by the transmitter, including that bit rate adaptation models to be used for bit rate adaptation, including parameters required for calculation of the bit rate adaptation, and effect signaling from the transmitter to the receiver in order to effect a distinction between self-decoding and non-self-decoding data packets.

29. An apparatus as defined in claim 28, wherein the bit rate adaptation is further configured to effect signaling of at least two different bit rate adaptation models.

30. An apparatus as defined in claim 28, wherein the distinction according to self-decoding and non-self-decoding data packets is signaled only in the case of puncturing, and not in the case of repetition.

31. An apparatus as defined in claim 28, wherein different bit rate adaptation models are used for bit rate adaptation of the bits in the repeat data packet and for bit rate adaptation of the bits in the data packet, so that bits with an identical information source are transferred by the transmitter to the receiver after bit rate adaptation is carried out at different places in the data packet and repeat data packet.

32. An apparatus as defined in claim 28, wherein the bit rate adaptation unit comprises:
a bit separation unit configured to separate the bits in a channel-coded bit stream into at least two partial bit streams;
at least two bit rate adaptation units allocated to the individual partial bit streams in order to subject the individual partial bit streams to separate bit rate adaptation processes; and
a bit collection unit configured to combine the bits from the individual partial bit streams produced by the bit rate adaptation units.

33. An apparatus to transfer data according to an ARQ method comprising:
a transmitter configured to transfer data to a receiver in the form of data packets,
the transmitter configured such that, after transmission of a data packet, a repeat data packet is transferred to the receiver when a corresponding request has been received from the receiver and bits to be transferred in the data packet or repeat data packet are subjected to bit rate adaptation by puncturing or repetition, before they are transferred by the transmitter to the receiver;
wherein the transmitter is further configured to perform the bit rate adaptation according to a bit rate adaptation model, such that the bit rate adaptation model, including parameters for calculation of the bit rate adaptation model, is signaled from the transmitter to the receiver, and, in the case of bit rate adaptation by puncturing, a signal is sent by the transmitter to the receiver to indicate whether a self-decoding or non-self-decoding data packet is being transferred.

34. An apparatus as defined in claim 33, wherein, in the case of bit rate adaptation by repetition, no signal is sent by the transmitter to indicate whether a self-decoding or non-self-decoding data packet is being transferred.

35. An apparatus as defined in claim 33, wherein a transmission resource that is used in the case of puncturing to signal whether a self-decoding or non-self-decoding data packet is being transferred, is used by the transmitter, in the case of repetition, to signal the bit rate adaptation model, including parameters for calculating the bit rate adaptation model.

36. An apparatus as defined in claim 33, wherein different bit rate adaptation models are used for bit rate adaptation of the bits in the repeat data packet and for bit rate adaptation of the bits in the data packet, so that bits with an identical information source are transferred by the transmitter to the receiver after bit rate adaptation is carried out at different places in the data packet and repeat data packet.

37. An apparatus as defined in claim 33, wherein the bit rate adaptation unit comprises:
a bit separation unit configured to separate the bits in a channel-coded bit stream into at least two partial bit streams;

at least two bit rate adaptation units allocated to the individual partial bit streams in order to subject the individual partial bit streams to separate bit rate adaptation processes; and a bit collection unit configured to combine the bits from the individual partial bit streams produced by the bit rate adaptation units.

38. A method as defined in claim 1, further comprising the steps of receiving and evaluating a data packet or repeat data packet at a receiver in order to determine the information content of the data packet by evaluating together the bits received in the data packet and in the repeat data packet.

39. A method for transferring data according to an ARQ methodology comprising:

transferring data from a transmitter to a receiver in the form of data packets, wherein at least one repeat data packet is transferred to the receiver by the transmitter after transmission of a data packet when a corresponding request is issued by the receiver;

subjecting bits to be transferred in the data packet or the at least one repeat data packet to bit rate adaptation by puncturing or repetition before they are transferred from the transmitter to the receiver, wherein the bit rate adaptation is carried out according to a bit rate adaptation model; and signaling the bit rate adaptation model, including parameters for calculating the bit rate adaptation model, from the transmitter to the receiver, wherein a signal is sent from the transmitter to the receiver to indicate whether the data packet is self-decoding or non-self-decoding when bit rate adaptation is accomplished by puncturing;

wherein the data packet is transferred according to a QPSK modulation or a higher-value modulation, including one of a 16-QAM modulation and 8-PSK modulation, wherein a mapping rule for the mapping of bits in the data packet to modulation symbols including parameters for describing the mapping rule is signaled from the transmitter to the receiver only in the case of a higher-value modulation, whereby signaling resources are used for this purpose, which are used in the case of QPSK modulation for signaling the bit rate adaptation model including parameters for calculating the bit rate adaptation model.

* * * * *